United States Patent
Asplund

(10) Patent No.: US 8,289,736 B2
(45) Date of Patent: Oct. 16, 2012

(54) CONVERSION OF AC LINES TO HVDC LINES

(75) Inventor: Gunnar Asplund, Ludvika (SE)

(73) Assignee: ABB Technology Ltd., Zürich (CH)

( * ) Notice: Subject to any disclaimer, the term of this patent is extended or adjusted under 35 U.S.C. 154(b) by 455 days.

(21) Appl. No.: 12/443,522

(22) PCT Filed: Sep. 29, 2006

(86) PCT No.: PCT/SE2006/001109
§ 371 (c)(1),
(2), (4) Date: May 19, 2010

(87) PCT Pub. No.: WO2008/039120
PCT Pub. Date: Apr. 3, 2008

(65) Prior Publication Data
US 2010/0232190 A1   Sep. 16, 2010

(51) Int. Cl.
*H02M 5/45* (2006.01)
*H02M 5/447* (2006.01)

(52) U.S. Cl. ............... 363/35; 363/37; 363/51; 363/52; 363/53; 363/54; 363/55; 363/56.01; 363/56.02; 363/56.03; 363/58; 363/127; 363/129; 363/132; 363/137

(58) Field of Classification Search ............. 363/35, 363/37, 51–55, 56.01, 56.02, 56.03, 58, 127, 363/129, 132, 137
See application file for complete search history.

(56) References Cited

U.S. PATENT DOCUMENTS

| | | | | |
|---|---|---|---|---|
| 4,507,724 A | * | 3/1985 | Glennon | 363/98 |
| 4,567,553 A | * | 1/1986 | Foch et al. | 363/98 |
| 4,730,242 A | * | 3/1988 | Divan | 363/37 |
| 5,008,801 A | * | 4/1991 | Glennon | 363/132 |
| 5,280,421 A | * | 1/1994 | De Doncker et al. | 363/98 |
| 5,491,622 A | * | 2/1996 | Carosa | 363/56.02 |
| 5,644,485 A | * | 7/1997 | Asplund | 363/129 |
| 5,717,584 A | * | 2/1998 | Rajashekara et al. | 363/98 |
| 5,872,707 A | * | 2/1999 | Asplund | 363/51 |
| 6,091,615 A | * | 7/2000 | Inoshita et al. | 363/98 |

(Continued)

FOREIGN PATENT DOCUMENTS
EP   0868016 A1   9/1998

OTHER PUBLICATIONS
PCT/ISA/210—International Search Report—Apr. 27, 2007.
(Continued)

*Primary Examiner* — Bao Q Vu
(74) *Attorney, Agent, or Firm* — Venable LLP; Eric J. Franklin

(57) ABSTRACT

An electric power transmission system includes at each end of a high voltage direct current transmission line including three conductors, a converter station for conversion of an alternating voltage into a direct voltage for transmitting direct current between the stations in all three conductors. Each station has a voltage source converter and an extra phase leg connected between the two pole conductors of the direct voltage side of the converter. A third of the conductors is connected to a midpoint between current valves of the extra phase leg. An arrangement is adapted to control the current valves of the extra phase leg to switch for connecting the third conductor either to the first pole conductor or the second pole conductor for utilizing the third conductor for conducting current between the stations.

20 Claims, 2 Drawing Sheets

U.S. PATENT DOCUMENTS

| | | | | |
|---|---|---|---|---|
| 6,141,228 | A | * | 10/2000 | Maurio ........................ 363/56.05 |
| 6,411,529 | B1 | * | 6/2002 | Svensson ......................... 363/35 |
| 6,714,427 | B1 | | 3/2004 | Barthold |
| 7,126,833 | B2 | * | 10/2006 | Peng .............................. 363/132 |
| 2010/0232190 | A1 | * | 9/2010 | Asplund ......................... 363/35 |

OTHER PUBLICATIONS

PCT/ISA/23—Written Opinion of the International Searching Authority—Apr. 27, 2007.

* cited by examiner

CONVERSION OF AC LINES TO HVDC LINES

CROSS-REFERENCE TO RELATED APPLICATIONS

This is the national phase under 35 U.S.C.§371 of PCT/SE2006/001109 filed 29 Sep. 2006.

TECHNICAL FIELD OF THE INVENTION

The present invention relates to the field of transmission of electric power through high voltage transmission lines, which may have conductors in the form of overhead conductors or cables. The invention is not restricted to any particular levels of such high voltages. Furthermore, it is pointed out that "conductor" is in this disclosure, in the description as well as in the claims, to be interpreted to cover overhead lines as well as cables, such as for instance of PEX-type or any other conceivable type.

Electric power may be transmitted through AC power systems or through DC power systems in the form of High Voltage Direct Current (HVDC) transmission systems.

AC power systems seldom reach the thermal maximum of the conductors thereof, but transfer limits are more often set by characteristics of the electrical network of which a line is a part than by the thermal limitations of its conductors. Beyond a certain level of power transfer synchronism of the AC system may be jeopardized, voltages may become depressed or unstable or the inadvertent loss of the line in question could not be accommodated by other lines on the system.

High Voltage Direct Current (HVDC) transmission overcomes some of these limitations of an AC system. Losses are reduced when transmitting electric power in a DC system compared to an AC systems, especially when the voltage in question is high. Furthermore, HVDC lines may operate up to the thermal limits of the conductors thereof. Another advantage of HVDC is that it is much more compatible with modern power brokering. Moreover, bipolar HVDC lines, equipped with metallic ground return can loose one conductor and still operate at half power.

It is for the above reasons understandable that the industry contemplates conversion of selected existing AC lines to HVDC lines.

However, would an AC transmission system be converted to a HVDC system and the AC system has a single circuit AC line with only three conductors this means that two of the conductors will form the two poles of the HVDC transmission line, while the third conductor will only serve as an emergency ground should one normal pole be out of service. Thus, this would render the thermal limit of single circuit AC lines converted to DC about the same as the prior AC limit. This problem is there for any other AC line with an odd number of conductors, such as nine.

PRIOR ART

U.S. Pat. No. 6,714,427 describes an electric power transmission system and a method for operation thereof making it more attractive to convert AC systems into HVDC system, since it proposes to design the converter stations at each end of the transmission line for conversion of an alternating voltage into a direct voltage for transmitting direct current between said stations in all three conductors. This is obtained by providing each of the three conductors with a separate mono-pole bridge of thyristor valves, which modulates the current so that short periods of over-current in the respective conductor are off-set by like periods of low current so as to obtain an acceptable rms current level thereby taking advantage of the thermal time constant of the conductors and equipment. This means that a DC current in one of the conductors may over a period of time have a level above that conductor's nominal thermally-limited current-carrying capacity, whereas the current in the opposite direction between the two stations of the system are shared by the other two conductors, and the current level in the conductors may be changed for rotating the higher level current among the three conductors. This means that the thermal limit of all three conductors may be utilized. When for instance the higher level is twice the lower level the losses will be reduced by 25% with respect to the case of only using two conductors. Thus, the method according to U.S. Pat. No. 6,714,427 makes it really interesting to convert AC systems into DC systems, since in the order of 50% more current may be transferred in said line when all three conductors are used instead of only two.

However, a full twelve pulse converter with bi-directional valves alternatively full anti-parallel valves are added to the converter in a converter station according to U.S. Pat. No. 6,714,427 for being able to use all three conductors of the line with respect to only using two conductors, which involves a considerable cost making the economic advantage interesting only in cases where HVDC instead of AC is close to justification anyway without using all three conductors.

The present invention relates to an electric power transmission system comprising at each end of a High Voltage Direct Current transmission line comprising three conductors, a converter station for conversion of an alternating voltage into a direct voltage for transmitting direct current between said stations in all three conductors as the system disclosed in U.S. Pat. No. 6,714,427.

SUMMARY OF THE INVENTION

The object of the present invention is to provide an electric power transmission system of this type, which is simplified with respect to the known system discussed above and by that less costly than that system making it even more attractive to convert existing AC systems with transmission lines having three conductors into HVDC systems.

This object is according to the invention obtained by providing such an electric power transmission system, which is characterized in that each said converter station comprises a Voltage Source Converter (VSC) with one or more phase legs having current valves of semiconductor devices of turn-off type and rectifying members in anti-parallel therewith connected in series between a first and a second so-called pole conductor of said conductors and a midpoint being connected to an alternating voltage side of the converter, and a control unit for switching the current valves by controlling the semiconductor devices thereof for converting said alternating voltage into a direct voltage applied to said two pole conductors, that the station further comprises an extra phase leg of current valves of semiconductor devices of turn-off type and rectifying members connected in anti-parallel therewith connected in series between said two pole conductors on the direct voltage side of said converter, that a third of said conductors is connected to a midpoint between current valves of said extra phase leg, and that the station further comprises an arrangement adapted to control said current valves of said extra phase leg to switch for connecting said third conductor either to the first pole conductor or the second pole conductor for utilizing the third conductor for conducting current between said stations.

Thus, by utilizing a VSC-converter in each converter station and only adding one extra phase leg all three conductors instead of only two may be utilized for carrying current and by that transmitting power between the stations. In the case of a three-phase alternating voltage applied to the alternating voltage side of the converter this means that there is only a need of ⅓ more current valves instead of twice as many current valves plus extra transformers as in the known system discussed above. This also means that the control to be carried out for the current sharing of the three conductors, i.e. the control of the current valves in said extra phase leg, will be simplified with respect to the control of the valves in the known system involving reduced costs for the control equipment and a higher reliability of the operation of the system.

According to an embodiment of the invention each said first and second conductors are between said stations connected in series with a resistor and a circuit for by-passing the resistor, and the system comprises means adapted to control said by-pass circuit for controlling current sharing among the three conductors by conducting the current through the respective pole conductor through the resistor or by-passing the resistor. This means a possibility to efficiently obtain the current sharing among the conductors aimed at.

According to another embodiment of the invention said means is adapted to control the by-pass circuit to by-pass said resistor during periods of time when the whole direct current in one direction between the stations is flowing in the respective pole conductor and to control the current to flow continuously or at least a part of the time through the resistor during periods of time when the current flowing from one station to the other is shared by the respective pole conductor and the third conductor. The losses introduced by arranging said resistor are by this eliminated during the period of time when there is no need for current sharing, since the whole direct current is flowing in the pole conductor in question.

According to another embodiment of the invention said by-pass circuit comprises a series connection of two oppositely directed current valves of a semiconductor device of turn-off type and a rectifying member connected in anti-parallel therewith, and said means is adapted to control the by-pass circuit by controlling said semiconductor devices. This is a suitable and simple way of realizing said by-pass circuit, in which for instance one or a few IGBT's may be used in such a current valve.

According to another embodiment of the invention the system comprises means adapted to switch the current valve or current valves between the terminal of said third conductor and that of one of the two pole conductors in said extra phase leg of one of the stations at a frequency for carrying out a DC/DC-conversion for influencing the level of the potential at said third conductor terminal connected to that phase leg and by that the current flowing in said third conductor for regulating current sharing between this conductor and the one of the two pole conductors conducting current in the same direction as the third conductor between the stations. This means a possibility to obtain proper current sharing without resistor and by-pass circuit avoiding the losses by the introduction of said resistor. The switching of the current valve or current valves in question of said extra phase leg is then created by PWM (Pulse Width Modulation), in which the switching frequency could be in the order of 1 kHz in order to avoid too big filters and substantial extra costs as a consequence of this DC/DC-conversion switching.

According to another embodiment of the invention said arrangement is adapted to control the current valves of said extra phase legs of the stations so that a current of a substantially constant level is flowing in said third conductor in a direction changing while changing in which one of the two pole conductors the full direct current in one direction between the stations is flowing. This constitutes an efficient and simple way of controlling the current in the three conductors, and the arrangement is preferably adapted to carry out said control for making said substantially constant level of the current in said third conductor being close to the thermal limits of the third conductor, so that this third conductor is fully utilized. This means that the two pole conductors are alternatingly carrying a current being above and below the rms thermal limit of that conductor. This is of course valid when there is a desire to transmit as much power as even possible through the transmission system, and when the load is lower the current in the different conductors will be lowered correspondingly, so that the current in the third conductor will then also be substantially lower than said thermal limit of that conductor.

According to another embodiment of the invention said arrangement is adapted to control the current valves of said extra phase legs to make the first and the third conductors share the direct current between the stations in one direction during a period of time followed by a corresponding period of time in which the second and the third conductors are sharing the current between the stations in the opposite direction, and the arrangement is adapted to carry out the control according to such periods of time being in the range of 20 seconds-30 minutes, 30 seconds-10 minutes or 1-5 minutes. This means that the switching of the extra phase leg in each station is for changing the direction of the current in said third conductor and starting a new period of time only carried out with this frequency, which accordingly may be less than once a minute. These periods of time may be longer for cables than for overhead lines.

According to another embodiment of the invention the system is designed to carry a voltage between said two pole conductors of 50 kV-1200 kV, especially above 100 kV, above 200 kV and above 400 kV. A HVDC transmission system instead of an AC transmission system is of course the more interesting the higher said voltage is.

According to another embodiment of the invention said converter has three said phase legs for connecting a three-phase alternating voltage to the alternating voltage side thereof. Although this will normally be the case, especially when an AC system having three conductors in a transmission line thereof is to be converted into a HVDC system, the invention also covers the case of connecting a single-phase alternating voltage to the alternating voltage side of the converter.

The invention also relates to a converter station for converting an alternating voltage into a direct voltage being a part of an electric power transmission system according to the invention.

The invention also relates to a method for controlling the flow of electric power in an electric power transmission system comprising at each end of a High Voltage Direct Current (HVDC) transmission line having three conductors, a converter station for conversion of an alternating voltage into a direct voltage for transmitting direct current between said stations in all three conductors. The advantageous features and advantages thereof as well as of the methods according to the embodiments appear from the discussion above of the system according to the invention.

The invention also relates to a computer program as well as a computer readable medium The steps of the method according to the invention are well suited to be controlled by a processor provided with such a computer program.

Other advantages as well as advantageous features of the invention will appear from the following description.

BRIEF DESCRIPTION OF THE DRAWINGS

With reference to the appended drawings, below follows a specific description of embodiments of the invention cited as examples.

In the drawings:

FIG. 3 is a circuit diagram of an electric power transmission system according to a second embodiment of the invention.

DETAILED DESCRIPTION OF EMBODIMENTS OF THE INVENTION

Figure 1:
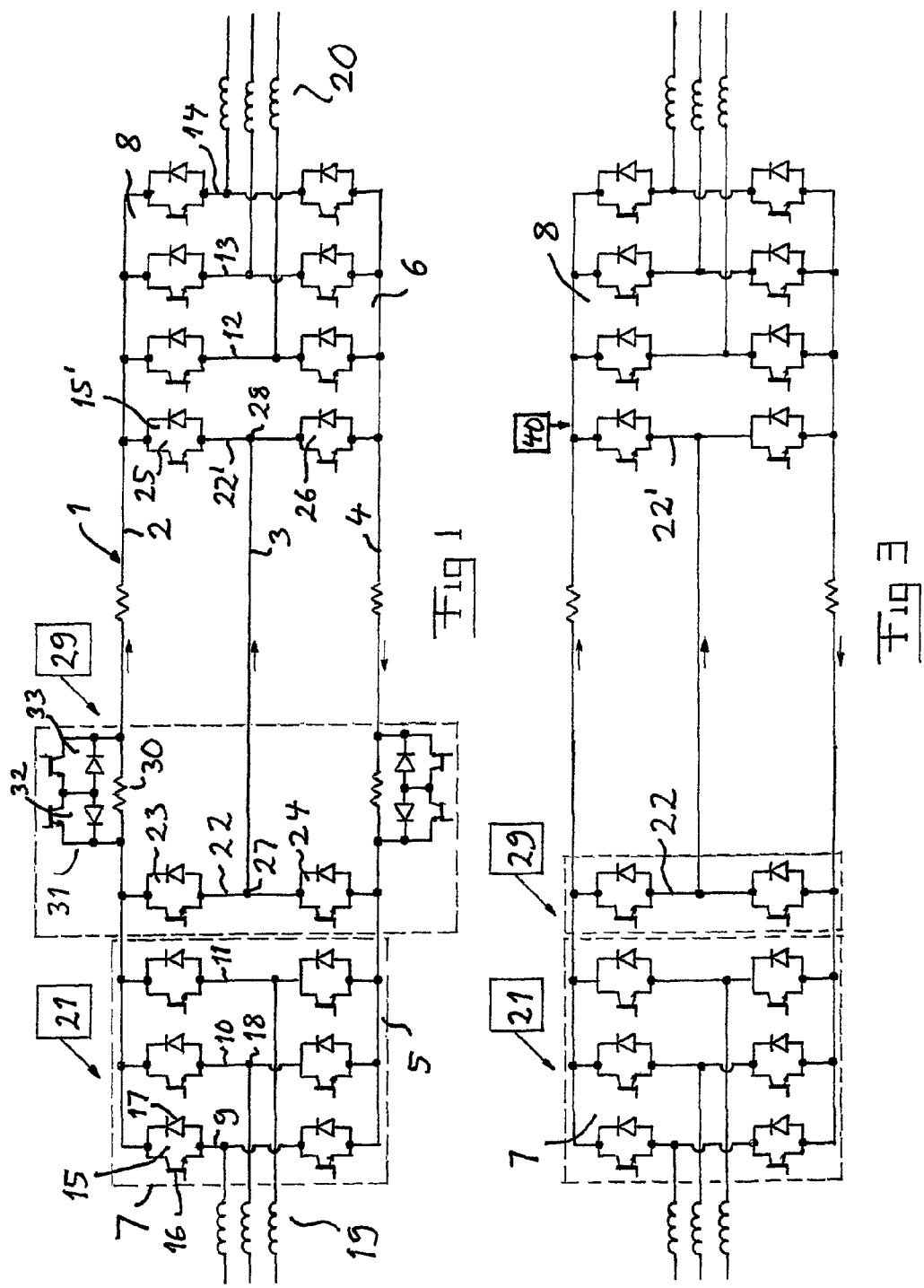
FIG. 1 is a schematic circuit diagram illustrating an electric power transmission system according to a first embodiment of the invention.

FIG. 1 schematically illustrates an electric power transmission system according to a first embodiment of the invention, which has been simplified for only showing the components necessary for explaining the invention. This system comprises at each end of a High Voltage Direct Current (HVDC) transmission line 1 having three conductors 2, 3, 4, a converter station 5, 6 for conversion of an alternating voltage into a direct voltage for transmitting direct current between said stations in all three conductors.

Each said converter station comprises a Voltage Source Converter (VSC) 7, 8 with three phase legs 9-11 and 12-14, respectively, having current valves 15 of semiconductor devices 16 of turn-off type, such as IGBT's, and rectifying members 17, such as rectifying diodes, in anti-parallel therewith connected in series between a first 2 and a second 4 so-called pole conductor of said conductors and a midpoint 18 being connected to an alternating voltage side 19, 20 of the converter in the form of a three-phase alternating voltage network, generator, load or the like.

Although for the sake of simplicity only shown for one of the stations 5 each converter station also comprises a control unit 21 for switching the current valves by controlling the semiconductor devices thereof for converting said alternating voltage into direct voltage applied to said two pole conductors 2, 4. The control unit will control the current valve according to a Pulse Width Modulation pattern by such switching with a frequency in the range of 1 kHz-10 kHz, through which the power flow direction between the two stations may be controlled, i.e. which one of the stations functions as rectifier and which one as inverter. It is pointed out that a plurality of semiconductor devices and rectifying members may be connected in series in each current valve for being able to together hold the voltage to be held by the current valve in the blocking stage thereof.

The system described so far, except for said third conductor 3, corresponds to a conventional high voltage direct current bipolar system. To this is according to the invention in each station an extra phase leg 22, 22' added, which has current valves 23-26 of semiconductor devices of turn-off type and rectifying members connected in anti-parallel therewith connected in series between the two pole conductors 2, 4 on the direct voltage side of the converter. The third conductor 3 is connected to a midpoint 27, 28 between current valves of said extra phase leg.

Each said station further comprises an arrangement 29 adapted to control said current valves of said extra phase leg to switch for connecting said third conductor either to the first pole conductor 2 or the second pole conductor 4 for utilizing the third conductor for conducting current between said stations.

The first 2 and second 4 conductors are between said stations connected in series with a resistor 30 and a circuit 31 for by-passing the resistor. The by-pass circuit comprises a series connection of two oppositely directed current valves 32, 33 of a semiconductor device of turn-off type, such as an IGBT, and a rectifying member, such as a rectifying diode, connected in anti-parallel therewith. Means included in said arrangement 29 are provided for controlling said by-pass circuit by controlling said semiconductor devices thereof.

Figure 2:
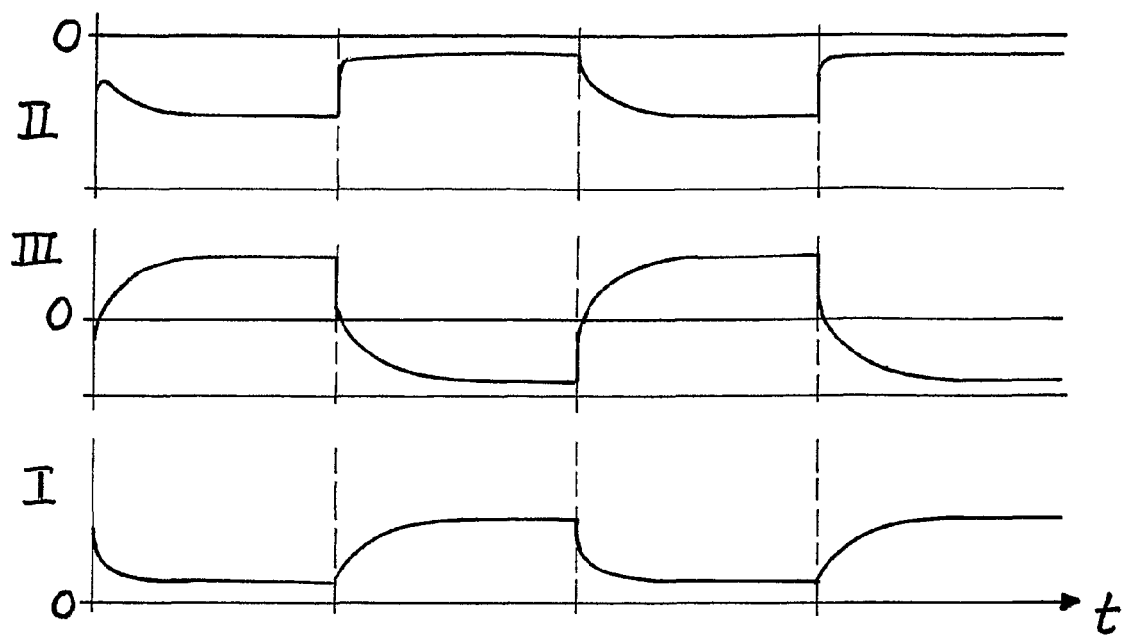
FIG. 2 is a graph of the currents in the three conductors of the transmission line in the system according to FIG. 1 versus time according to a simulation model.

The function of the transmission system according to FIG. 1 is as follows. It is shown how the full current between the two stations is carried by the second pole conductor 4, whereas the first pole conductor 2 and the third conductor 3 are sharing the current flowing in the other direction. This means that the current valve 23 of the extra phase leg 22 is switched to connect the midpoint 27 to the first conductor 2 for sharing the current therewith. The current through the first conductor 2 will in this state be led through the resistor 30 for obtain proper current sharing, whereas the by-pass circuit in the second pole conductor 4 will be switched in for by-passing the resistor 30 belonging to that conductor carrying the full current. This may constitute the first period of time in the graph of FIG. 2, in which then the current for the second conductor II, the third conductor III and the first conductor I are shown counted from above. The arrangement 29 may in this state control the current valves of the extra phase legs of the station so that a current of a substantially constant level being close to the thermal limits of the third conductor is flowing in the third conductor. The arrangement is also adapted to control the extra phase legs to make the first and the third conductors share the direct current between the stations in one direction during a period of time followed by a corresponding period of time in which the second and the third conductors are sharing the current between the stations in the opposite direction as shown in FIG. 2. The current valves of said extra phase legs may be switched in the order of once a minute for changing from one such time period to another, but in the simulations illustrated in FIG. 2 such switching has been carried out once a second.

FIG. 3 illustrates a power transmission system according to a second embodiment of the invention, which differs from the one according to FIG. 1 by the omission of the resistor with by-pass circuit in the two pole conductors for obtaining proper current sharing. Means 40 are instead arranged for switching the current valve or current valves between the terminal 27, 28 of said third conductor and that of one of the two pole conductors 2, 4 in a said extra leg 22, 22' of one of the stations at a frequency for carrying out a DC/DC-conversion, such as 1 kHz, for influencing the level of the potential at said third conductor terminal connecting to that phase leg and by that the current flow in said third conductor for regulating current sharing between this conductor and the one of the two pole conductors conducting current in the same direction as the third conductor between the stations. This would in the case of the current flow as shown in FIG. 3 means that the current valve 15' of the extra phase leg 22' is switched at said frequency for carrying out said DC/DC-conversion for suitably influencing the level of the potential in the point 28 for obtaining proper current sharing between the first conductor 2 and the third conductor 3. This embodiment gives possibility to modulate the currents with great accuracy, and there is no need for extra valves of a by-pass circuit and big resistors to cool. However, there will be some switching losses as the extra phase leg in one of the stations will have to switch constantly.

The invention is of course not in any way restricted to the embodiments described above, but many possibilities to modifications thereof will be apparent to a person with ordinary skill in the art without departing from the basic idea of the invention as defined in the appended claims.

The invention is applicable to any electric power transmission system having a transmission line with at least three conductors, preferably an odd number of conductors, in which one or more groups of three of them are arranged according to the invention.

The invention claimed is:

1. An electric power transmission system, comprising:
   a high voltage direct current line transmission line comprising three conductors; and
   a converter station arranged at each end of the high voltage direct current line transmission line, the converter station is configured to convert an alternating voltage into a direct voltage for transmitting direct current between said stations in all three conductors, each converter station comprises a voltage source converter comprising at least one phase legs having current valves of turn-off semiconductor devices and rectifying members arranged anti-parallel with the semiconductor devices, the rectifying members being connected in series between a first and a second pole conductor of said conductors and a midpoint being connected to an alternating voltage side of the converter, and a control unit for switching the current valves by controlling the semiconductor devices thereof for converting said alternating voltage into a direct voltage applied to said two pole conductors, wherein the converter station further comprises an extra phase leg of current valves of semiconductor devices of turn-off type and rectifying members connected in anti-parallel therewith connected in series between said two pole conductors on the direct voltage side of said converter, wherein a third of said conductors is connected to a midpoint between current valves of said extra phase leg, and wherein the converter station further comprises an arrangement adapted to control said current valves of said extra phase leg to switch for connecting said third conductor either to the first pole conductor or the second pole conductor for utilizing the third conductor for conducting current between said stations.

2. The system according to claim 1, wherein each said first and second conductor is arranged between said stations connected in series with a resistor and a circuit for by-passing the resistor, the system further comprising:
   a control configured to control said by-pass circuit for controlling current sharing among the three conductors by conducting the current through the respective pole conductor through the resistor or by-passing the resistor.

3. The system according to claim 2, wherein the control is adapted to control the by-pass circuit to by-pass said resistor during periods of time when the whole direct current in one direction between the stations is flowing in the respective pole conductor and to control the current to flow continuously or at least a part of the time through the resistor during periods of time when the current flowing from one station to the other is shared by the respective pole conductor and the third conductor.

4. The system according to claim 2, wherein said by-pass circuit comprises a series connection of two oppositely directed current valves of a turn-off semiconductor device and a rectifying member connected in anti-parallel therewith, and wherein the control is adapted to control the by-pass circuit by controlling said semiconductor devices.

5. The system according to claim 1, further comprising:
   a switch adapted to switch the current valve or current valves between the terminal of said third conductor and the terminal of one of the two pole conductors in a said extra phase leg of one of the stations at a frequency for carrying out a DC/DC-conversion for influencing the level of the potential at said third conductor terminal connecting to the phase leg and thereby the current flowing in said third conductor for regulating current sharing between this conductor and the one of the two pole conductors conducting current in the same direction as the third conductor between the stations.

6. The system according to claim 1, wherein said arrangement is adapted to control the current valves of said extra phase legs of the stations so that a current of a substantially constant level is flowing in said third conductor in a direction changing while changing in which one of the two pole conductors the full direct current in one direction between the stations is flowing.

7. The system according to claim 6, wherein said arrangement is adapted to carry out said control for making said substantially constant level of the current in said third conductor being close to the thermal limits of the third conductor.

8. The system according to claim 1, wherein said arrangement is adapted to control the current valves of said extra phase legs to make the first and the third conductors share the direct current between the stations in one direction during a period of time followed by a corresponding period of time in which the second and the third conductors are sharing the current between the stations in the opposite direction, and wherein the arrangement is adapted to carry out the control according to a period of time being in the range of 20 seconds-30 minutes.

9. The system according to claim 1, wherein the system is designed to carry a voltage between said two pole conductors of 50 kV-1200 kV.

10. The system according to claim 1, wherein said converter has three said phase legs for connecting a three-phase alternating voltage to the alternating voltage side thereof.

11. A converter station for converting an alternating voltage into a direct voltage, comprising:
   a voltage source converter comprising at least one phase legs comprising current valves of turn-off semiconductor devices and rectifying members arranged anti-parallel with the semiconductor devices, the rectifying members being connected in series between a first and a second pole conductor of said conductors and a midpoint being connected to an alternating voltage side of the converter, and a control unit for switching the current valves by controlling the semiconductor devices thereof for converting said alternating voltage into a direct voltage applied to said two pole conductors;
   an extra phase leg of current valves of turn-off semiconductor devices and rectifying members connected in anti-parallel with the turn-off semiconductor device connected in series between said two pole conductors on the direct voltage side of said converter, wherein a third of said conductors is connected to a midpoint between current valves of said extra phase leg; and
   an arrangement adapted to control said current valves of said extra phase leg to switch for connecting said third conductor either to the first pole conductor or the second pole conductor for utilizing the third conductor for conducting current between said stations.

12. A method for controlling a flow of electric power in an electric power transmission system comprising at each end of a high voltage direct current transmission line comprising three conductors, a converter station for conversion of an alternating voltage into a direct voltage for transmitting direct current between said stations in all three conductors, the method comprising:
  carrying out the control for a system in which each converter station comprises a voltage source converter with one or more phase legs having current valves of turn-off semiconductor devices and rectifying members in anti-parallel therewith connected in series between a first and a second pole conductor of said conductors and a midpoint being connected to an alternating voltage side of the converter, and a control unit for switching the current valves by controlling the semiconductor devices thereof for converting said alternating voltage into a direct voltage applied to said two pole conductors, the station further comprising an extra phase leg of current valves of semiconductor devices of turn-off type and rectifying members connected in anti-parallel therewith connected in series between said two pole conductors on the direct voltage side of said converter, in which a third of said conductors is connected to a midpoint between current valves of said extra phase leg, and
  controlling the current valves of said extra phase leg to switch for connecting said third conductor either to the first pole conductor or the second pole conductor for utilizing the third conductor for conducting current between said stations.

13. The method according to claim 12, wherein the current through each of the pole conductors is controlled to either flow through a resistor or by-pass said resistor for controlling current sharing among the three conductors.

14. The method according to claim 13, wherein when the whole direct current in one direction between the stations is flowing in a pole conductor this is controlled to by-pass said resistor, and when the current flowing from one station to the other is by this pole conductor shared with the third conductor the current is controlled to flow continuously for at least a part of the time through the resistor.

15. The method according to claim 12, wherein the current valve or current valves between the terminal of said third conductor and that of one of the two pole conductors in a said extra phase leg of one of the stations is switched at a frequency for carrying out a DC/DC-conversion for influencing the level of the potential at said third conductor terminal connecting to that phase leg and by that the current flowing in said third conductor for regulating current sharing between this conductor and the one of the two pole conductors conducting current in the same direction as the third conductor between said stations.

16. The method according to claim 12, wherein the current valves of said extra phase legs of the stations are controlled so that a current of a substantially constant level is flowing in said third conductor in a direction changing while changing in which one of the two pole conductors the full direct current in one direction between the stations is flowing.

17. The method according to claim 16, wherein said control of the current valves of said extra phase legs is carried out so that said substantially constant level of the current in said third conductor is close to the thermal limits of the third conductor.

18. The method according to claim 12, wherein the current valves of said extra phase legs are controlled to make the first and the third conductors share the direct current between the stations in one direction during a period of time followed by a corresponding period of time in which the second and the third conductors are sharing the current between the stations in the opposite direction, and that the control is carried out according to a period of time being in the range of 20 seconds-30 minutes.

19. A computer program product, comprising:
  a computer readable medium; and
  computer program instructions recorded on the computer readable medium and executable by a processor for carrying out a method for controlling a flow of electric power in an electric power transmission system comprising at each end of a high voltage direct current transmission line comprising three conductors, a converter station for conversion of an alternating voltage into a direct voltage for transmitting direct current between said stations in all three conductors, the method comprising:
  carrying out the control for a system in which each converter station comprises a voltage source converter with one or more phase legs having current valves of turn-off semiconductor devices and rectifying members in anti-parallel therewith connected in series between a first and a second pole conductor of said conductors and a midpoint being connected to an alternating voltage side of the converter, and a control unit for switching the current valves by controlling the semiconductor devices thereof for converting said alternating voltage into a direct voltage applied to said two pole conductors, the station further comprising an extra phase leg of current valves of semiconductor devices of turn-off type and rectifying members connected in anti-parallel therewith connected in series between said two pole conductors on the direct voltage side of said converter, in which a third of said conductors is connected to a midpoint between current valves of said extra phase leg, and
  controlling the current valves of said extra phase leg to switch for connecting said third conductor either to the first pole conductor or the second pole conductor for utilizing the third conductor for conducting current between said stations.

20. The computer program product according to claim 19, wherein the computer program instructions are at least partially provided through a network.

* * * * *